Patented Feb. 21, 1933

1,898,452

UNITED STATES PATENT OFFICE

MAX ALBERT KUNZ AND KARL KÖBERLE, OF MANNHEIM, AND ERICH BERTHOLD, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

PRODUCTION OF VAT DYESTUFFS OF THE DIBENZANTHRONE SERIES

No Drawing. Application filed July 20, 1928, Serial No. 294,307, and in Germany November 7, 1927.

We have found that new and valuable nitrogenous vat dyestuffs are produced by subjecting nitrogenous dibenzanthrones to a mild alkaline treatment.

The expression "nitrogenous dibenzanthrones" in the following description and in the appended claims is meant to comprise nitrodibenzanthrones, their derivatives or homologues, for instance the Bz2-nitrodibenzanthrones obtainable in the manner described in the U. S. Patent No. 796,393 which may be further purified by fractionally precipitating the said crude nitrodibenzanthrones, dissolved in concentrated sulfuric acid, by carefully adding proper diluents, according to U. S. Patent No. 1,513,851; further nitro iso-dibenzanthrones, as may be obtained by nitration of an iso-dibenzanthrone in nitrobenzene, and other nitrogenous dibenzanthrones or iso-dibenzanthrones or their derivatives, so far as they contain at least one displaceable hydrogen atom on the nitrogen, such as aminodibenzanthrones and aminoisodibenzanthrones, which may be prepared, inter alia, from the corresponding nitro compounds by reduction.

As mild alkaline agents may be employed alkali metal or alkaline earth metal salts of weak acids such as sodium or potassium formate, sodium or potassium or calcium acetate or potassium carbonate, or caustic alkalis in the presence of solvents or diluents.

The treatment is preferably carried out at temperatures between about 150° C. and 250° C.

Solvents or diluents such as nitrobenzene, nitrotoluene, nitronaphthalene and the like may be employed, and if desired catalysts may be added, such as copper in the form of its oxides or salts, including the complex salts, for instance the copper ammonia complex-salts.

The condensation products are obtained in good yields. Yet it may be remarked that in some cases impending on the conditions of the reaction in which the duration of the treatment, the alkalinity of the agents employed and the presence or absence of the catalyst, are important factors, the dyestuffs obtained are subjected to variation.

In every case the resulting dyestuffs give very fast and strong dyeings on cotton from a usually blue alkaline hydrosulfite vat. The dyestuffs dissolve in concentrated sulfuric acid to usually red or green solutions.

The following examples will further illustrate the nature of the said invention which however is not limited thereto. The parts are by weight.

Example 1

50 parts of Bz2-nitrodibenzanthrone, obtainable according to U. S. Patent No. 1,513,851, are stirred and boiled in 400 parts of nitrobenzene with 40 parts of potassium acetate and 3 parts of copper oxid until the formation of the dyestuff is complete, which can be recognized by a test sample giving a red solution with concentrated sulfuric acid. After cooling and filtering by suction, the residue is washed with dilute mineral acid and water, and dried. The reaction mixture may also be treated by diluting it with nitrobenzene while still hot, and filtering it by suction, in the same condition, from any impurities present, whereupon the dyestuff separates out in a pure state from the solution on cooling. It is in the form of a dark blue powder which crystallizes in dark violet needles from nitrobenzene, dissolves to a red solution in concentrated sulfuric acid and gives powerful, blue-grey dyeings, particularly fast to chlorine on cotton, from a blue vat.

If the potassium acetate be replaced by other salts having a weakly alkaline reaction, such as potassium carbonate, sodium acetate or potassium formate, dyestuffs of similar character are obtained.

Example 2

10 parts of tetrabrom-nitrodibenzanthrone, obtainable by brominating nitrodibenzanthrone in nitrobenzene at 160° C. with the aid of iron as halogen transferrer, are treated with 10 parts of potassium carbonate in 750 parts of nitrobenzene as described in the foregoing example. The dyestuff obtained is a dark violet powder dissolving in concentrated sulfuric acid to a claret red solution and dyeing cotton from a blue vat grey-blue shades of excellent fastness.

Example 3

50 parts of nitroisodibenzanthrone, obtained by nitrating isodibenzanthrone with nitric acid, in nitrobenzene, are boiled in 500 parts of nitrobenzene, with 75 parts of potassium acetate and 2 parts of copper oxid until the initially green color of the solution of the reaction mixture has turned blue. The further treatment is the same as described in Example 1. The resulting dyestuff, a blue-black powder, dissolves to a green solution in concentrated sulfuric acid, and gives strong and fast blue-grey dyeings on cotton from a blue vat.

Products with similar tinctorial properties are obtained by treating nitroisodibenzanthrone with potassium carbonate or caustic alkalis in the presence of a diluent.

Example 4

1 part of Bz2-aminodibenzanthrone (prepared according to U. S. Patent No. 796,393, Example 3) is heated to boiling with 2 parts of sodium formate in 25 to 50 parts of nitrobenzene, and stirred at the same temperature until a sample dissolves to a Bordeaux-red solution in concentrated sulfuric acid. When cold, the dyestuff can be recovered by filtering by suction, or by distilling-off the nitrobenzene with steam.

The new dyestuff is a grey-black powder, and when applied to cotton in a blue vat, furnishes dyeings which become a fast, strong grey-black on hanging in the air.

A dyestuff with similar properties is obtained by replacing sodium formate by, for example, potassium acetate.

Example 5

1 part of Bz2-aminodibenzanthrone, prepared according to U. S. Patent No. 1513851, with subsequent reduction of the nitro compound in 25 parts of nitrobenzene is subjected, in the manner described in Example 4, to the action of 1 part of potassium carbonate and 0.1 part of cupric oxid. The resulting dyestuff has similar properties to that described in Example 4.

Example 6

1 part of tetrabromaminodibenzanthrone, obtained by brominating aminodibenzanthrone in nitrobenzene at 160° C. with the addition of iron, is stirred and boiled with 1 part of potassium carbonate in 30 parts of nitrobenzene until the formation of the dyestuff is completed. The further treatment may be carried out in the same manner as in Example 4. A grey-blue powder is obtained, which dissolves to a bordeaux-red solution in sulfuric acid, and gives very fast grey-blue dyeings on cotton from a green-blue vat.

Example 7

1 part of aminoisodibenzanthrone, obtained by the reduction of nitroisodibenzanthrone for example with alkali metal hydrosulfite, is treated with 1 part of potassium carbonate in 20 parts of nitrobenzene as described in Examples 4 to 6. The resulting dyestuff gives a blue-grey solution with sulfuric acid, and furnishes grey dyeings, with a bluish tinge, on cotton, from a blue vat.

What we claim is:—

1. As a new article of manufacture, nitrogenous vat dyestuffs of the dibenzanthrone series, giving from blue-grey and blue-green to grey and grey-black fast dyeings on cotton from a usually blue vat, dissolving to a green or red solution in concentrated sulfuric acid, which are obtainable by acting on a nitrogenous compound selected from the group consisting of nitro and amino compounds of dibenzanthrone, isodibenzanthrone and their halogen substitution products, with a non-reducing alkali metal salt of a weak acid.

2. As a new article of manufacture nitrogenous vat dye-stuffs of the dibenzanthrone series, giving blue-grey fast dyeings on cotton from a blue vat, dissolving to a red solution in concentrated sulfuric acid, and which are obtainable by treating a nitrodibenzanthrone in boiling nitrobenzene with a non-reducing alkali metal salt of a weak acid.

3. As a new article of manufacture the nitrogenous vat dyestuff of the dibenzanthrone series, recrystallizing in dark violet needles from nitrobenzene, giving blue-grey fast dyeings on cotton from a blue vat, dissolving to a red solution in concentrated sulfuric acid, and which are obtainable by treating Bz2-nitrodibenzanthrone with potassium acetate in the presence of copper oxid.

4. A process of producing new vat dyestuffs which comprises acting on a nitrogenous compound selected from the group consisting of nitro and amino compounds of dibenzanthrone, isodibenzanthrone and their halogen substitution products with a non-reducing alkaline agent selected from the group consisting of alkali metal and alkaline earth metal compounds.

5. A process of producing new vat dyestuffs which comprises acting on a nitrogenous compound selected from the group consisting of nitro and amino compounds of dibenzanthrone, isodibenzanthrone and their halogen substitution products in an organic diluting medium with a non-reducing alkaline agent selected from the group consisting of alkali metal and alkaline earth metal compounds.

6. A process of producing new vat dyestuffs which comprises acting on a nitrogenous compound selected from the group consisting of nitro and amino compounds of dibenzanthrone, isodibenzanthrone and their halogen substitution products in an organic diluting medium with a non-reducing alkaline agent selected from the group consisting of alkali metal and alkaline earth metal compounds at temperatures between 150° and 250° C.

7. A process of producing new vat dyestuffs which comprises acting on a nitro-dibenzanthrone in an organic diluting medium with a non-reducing alkali metal salt of a weak acid at temperatures between 150° and 250° C.

8. A process of producing new vat dyestuffs which comprises acting on Bz2-nitro-dibenzanthrone in an organic diluting medium with a non-reducing alkali metal salt of a weak acid at temperatures between 150° and 250° C.

In testimony whereof we have hereunto set our hands.

MAX ALBERT KUNZ.
KARL KÖBERLE.
ERICH BERTHOLD.